(12) United States Patent
Ozaki et al.

(10) Patent No.: US 11,735,132 B2
(45) Date of Patent: Aug. 22, 2023

(54) DISPLAY DEVICE WRITES A SAME IMAGE TO A PREDETERMINED NUMBER OF LINES

(71) Applicant: Japan Display Inc., Tokyo (JP)

(72) Inventors: Tadafumi Ozaki, Tokyo (JP); Tsutomu Harada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/552,679

(22) Filed: Dec. 16, 2021

(65) Prior Publication Data

US 2022/0108665 A1 Apr. 7, 2022

Related U.S. Application Data

(63) Continuation of application No. PCT/JP2020/019756, filed on May 19, 2020.

(30) Foreign Application Priority Data

Jun. 17, 2019 (JP) ................................ 2019-111903

(51) Int. Cl.
*G09G 3/36* (2006.01)
*G02F 1/133* (2006.01)
*G09G 3/20* (2006.01)

(52) U.S. Cl.
CPC ........... *G09G 3/3648* (2013.01); *G02F 1/133* (2013.01); *G09G 3/2003* (2013.01); *G09G 2310/08* (2013.01)

(58) Field of Classification Search
None
See application file for complete search history.

(56) References Cited

U.S. PATENT DOCUMENTS

2003/0169247 A1 9/2003 Kawabe et al.
2004/0041760 A1* 3/2004 Tsumura .............. G09G 3/3648
345/87

(Continued)

FOREIGN PATENT DOCUMENTS

JP 2003-255915 A 9/2003
JP 2007-304385 A 11/2007

(Continued)

OTHER PUBLICATIONS

Search Report issued in International Patent Application No. PCT/JP2020/019756 dated Aug. 11, 2020 and English translation of same. 5 pages.

(Continued)

*Primary Examiner* — Kirk W Hermann
(74) *Attorney, Agent, or Firm* — K&L Gates LLP

(57) ABSTRACT

A display device includes: a display panel to display a frame image by arranging line images; and a light source. One frame period includes sub-frame periods each including a writing period and a display period. The line images are written in units of a predetermined number of lines during the writing period. The line images that are written at a time in units of the predetermined number of lines are the same image. In two continuous sub-frame periods in the one frame period, when a line image to be written during the writing period in a preceding sub-frame period differs from a line image to be written during the writing period in a subsequent sub-frame period, a start position of the writing period in the preceding sub-frame period and a start position of the writing period in the subsequent sub-frame period are shifted by one line from each other.

10 Claims, 13 Drawing Sheets

| FIELD PERIOD | FI11 | FI12 | FI13 | FI21 | FI22 | FI23 |
|---|---|---|---|---|---|---|
| MODE | P | N | P | N | P | N |
| LUMINANCE INDEX | α | β | α | β | α | β |
| LIGHT QUANTITY | κ | λ | κ | λ | κ | λ |

(56) References Cited

U.S. PATENT DOCUMENTS

| | | | | | |
|---|---|---|---|---|---|
| 2005/0219188 | A1* | 10/2005 | Kawabe | ................. | G09G 3/342 |
| | | | | | 345/94 |
| 2008/0074568 | A1* | 3/2008 | Tanaka | ................. | G09G 3/3614 |
| | | | | | 349/37 |
| 2016/0155405 | A1* | 6/2016 | Kim | ....................... | G09G 3/003 |
| | | | | | 345/88 |
| 2018/0211611 | A1* | 7/2018 | Kato | ................. | G02F 1/134309 |

FOREIGN PATENT DOCUMENTS

| | | |
|---|---|---|
| JP | 2010-097420 A | 4/2010 |
| JP | 2016-110115 A | 6/2016 |
| JP | 2018-120021 A | 8/2018 |

OTHER PUBLICATIONS

Written Opinion issued in International Patent Application No. PCT/JP2020/019756 dated Aug. 11, 2020. 4 pages.
Office Action issued in related Japanese Patent Application No. 2019-111903 dated Sep. 6, 2022 and English translation of same. 6 pages.

* cited by examiner

| (G) | DISPLAY OUTPUT |
|---|---|
| y1 | RGB1 |
| y2 | (RGB1+RGB2)/2 |
| y3 | (RGB2+RGB3)/2 |
| y4 | (RGB3+RGB4)/2 |
| y5 | (RGB4+RGB5)/2 |
| ⋮ | ⋮ |
| y(L) | {RGB(L-1)+RGB(L)}/2 |
| y(L+1) | {RGB(L)+RGB(L+1)}/2 |
| y(L+2) | {RGB(L+1)+RGB(L+2)}/2 |
| ⋮ | ⋮ |

FIG.6

| FRAME RATE | RGB LIGHT SOURCE LIGHTING FREQUENCY | CBI |
|---|---|---|
| SAME AS RGB LIGHT SOURCE LIGHTING FREQUENCY | 60 Hz | 685.22 |
| | 120 Hz | 342.61 |
| | 240 Hz | 171.30 |
| 60 Hz | 60 Hz | 685.22 |
| | 120 Hz | 410.11 |
| | 240 Hz | 299.02 |

FIG.7

| SUB-FRAME PERIOD | SFL1 | SFL2 |
|---|---|---|
| MODE | P | N |
| LUMINANCE INDEX | $\alpha$ | $\beta$ |
| LIGHT QUANTITY | $\kappa$ | $\lambda$ |

FIG.9

| FIELD PERIOD | FI11 | FI12 | FI13 | FI21 | FI22 | FI23 |
|---|---|---|---|---|---|---|
| MODE | P | N | P | N | P | N |
| LUMINANCE INDEX | $\alpha$ | $\beta$ | $\alpha$ | $\beta$ | $\alpha$ | $\beta$ |
| LIGHT QUANTITY | $\kappa$ | $\lambda$ | $\kappa$ | $\lambda$ | $\kappa$ | $\lambda$ |

FIG.13

| FRAME | | FL1 | | | | |
|---|---|---|---|---|---|---|
| FIELD PERIOD | FI11 | FI12 | FI13 | FI21 | FI22 | FI23 |
| MODE | P | P | N | N | P | P |
| LUMINANCE INDEX | $\alpha$ | $\alpha$ | $\beta$ | $\beta$ | $\alpha$ | $\alpha$ |
| LIGHT QUANTITY | $\kappa$ | $\kappa$ | $\lambda$ | $\lambda$ | $\kappa$ | $\kappa$ |

FIG. 14

| FRAME | FL2 | | | | | |
|---|---|---|---|---|---|---|
| FIELD PERIOD | FI11 | FI12 | FI13 | FI21 | FI22 | FI23 |
| MODE | N | N | P | P | N | N |
| LUMINANCE INDEX | β | β | α | α | β | β |
| LIGHT QUANTITY | λ | λ | κ | κ | λ | λ |

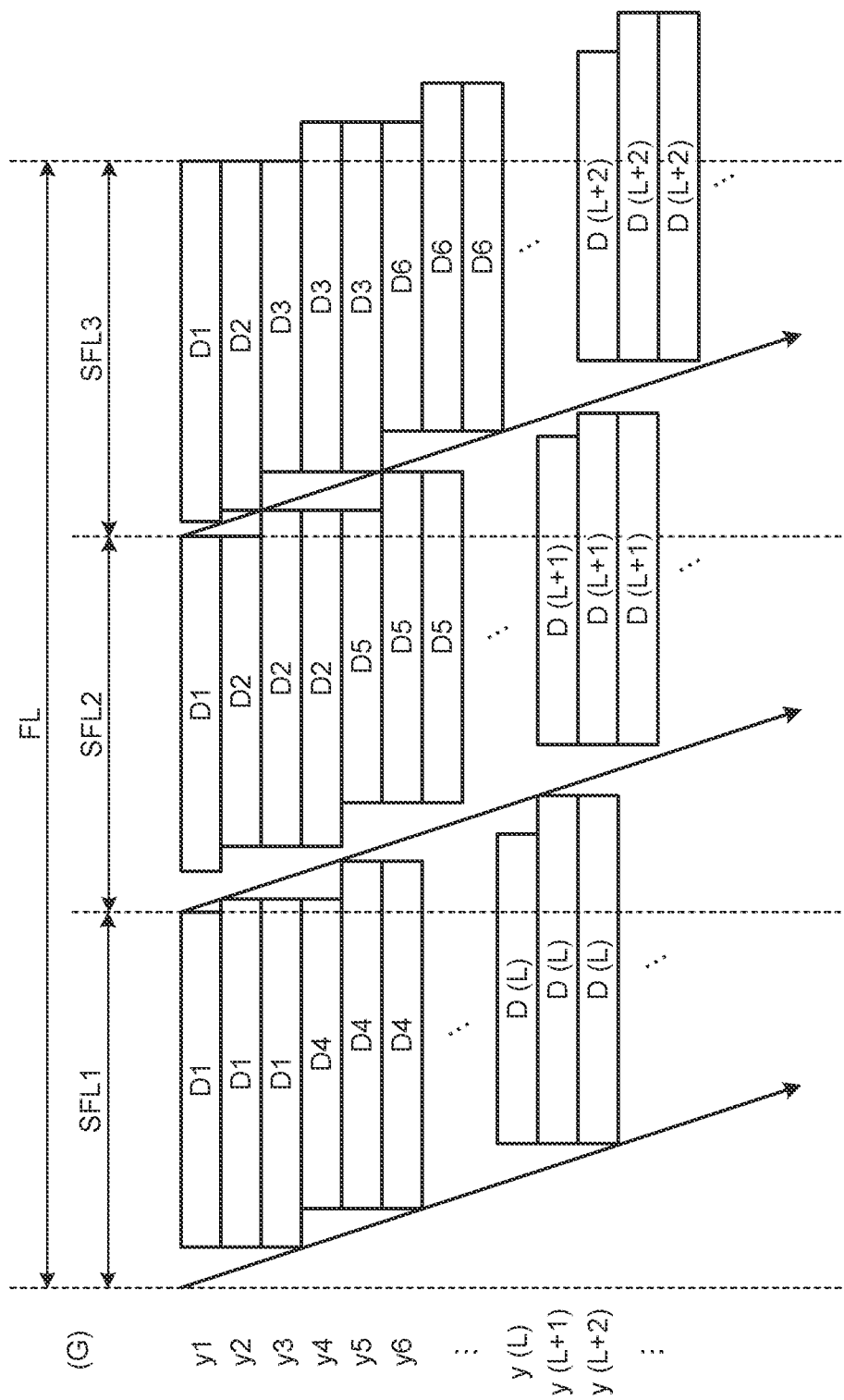

DISPLAY DEVICE WRITES A SAME IMAGE TO A PREDETERMINED NUMBER OF LINES

CROSS-REFERENCE TO RELATED APPLICATION

This application claims the benefit of priority from Japanese Patent Application No. 2019-111903 filed on Jun. 17, 2019 and International Patent Application No. PCT/JP2020/019756 filed on May 19, 2020, the entire contents of which are incorporated herein by reference.

BACKGROUND

1. Technical Field

What is disclosed herein relates to a display device.

2. Description of the Related Art

It is known that there are (field sequential) liquid crystal display devices in which pixels are controlled such that light in a plurality of colors is transmitted from the same pixel at timings different from one another (for example, Japanese Patent Application Laid-open Publication No. 2010-097420).

In such a field sequential display device, if a frame rate is low with respect to a human visual ability, an unintended variation in color called "color breakup" may be visible.

For the foregoing reasons, there is a need for a display device capable of reducing the color breakup.

SUMMARY

According to an aspect, a display device includes: a display panel that includes a liquid crystal filled between two substrates facing each other and is configured to display a frame image by arranging a plurality of line images in a scan direction; and a light source that is configured to emit light to the display panel. One frame period allocated to the one frame image includes a predetermined number of sub-frame periods, the predetermined number being a natural number equal to or larger than two. Each of the sub-frame periods includes a writing period of the line images and a display period in which the light is emitted from the light source. The line images are written in units of a predetermined number of lines during the writing period. The line images that are written at a time in units of the predetermined number of lines are the same line image. In two of the sub-frame periods that are continuous in the one frame period, when a line image to be written during the writing period in a preceding sub-frame period of the two sub-frame periods differs from a line image to be written during the writing period in a subsequent sub-frame period of the two sub-frame periods, a start position of the writing period in the preceding sub-frame period and a start position of the writing period in the subsequent sub-frame period are shifted by one line from each other.

According to an aspect, a display device includes: a display panel that includes a liquid crystal filled between two substrates facing each other and is configured to display a frame image by arranging a plurality of line images in a scan direction; and a light source that is configured to emit light to the display panel. One frame period allocated to the one frame image includes a predetermined number of sub-frame periods, the predetermined number being a natural number equal to or larger than two. The light source includes a plurality of light sources of a plurality of colors, the lighting periods of which are individually controllable. Each of the sub-frame periods includes a plurality of field periods each provided for a corresponding color of the colors. Each of the field periods includes a writing period of the line images and a display period in which the light is emitted from the light source. The line images are written in units of a predetermined number of lines during the writing period. The line images that are written at a time in units of the predetermined number of lines are the same line image. In continuous two of the field periods, when a line image to be written during the writing period in a preceding field period of the two field periods differs from a line image to be written during the writing period in a subsequent field period of the two field periods, a start position of the writing period in the preceding field period and a start position of the writing period in the subsequent field period are shifted by one line from each other. A polarity of an electric field between the two substrates is inverted at a cycle of the field period.

According to an aspect, a display device includes: a display panel that includes a liquid crystal filled between two substrates facing each other and is configured to display a frame image by arranging a plurality of line images in a scan direction; and a light source that is configured to emit light to the display panel. One frame period allocated to the one frame image includes a predetermined number of sub-frame periods, the predetermined number being a natural number equal to or larger than two. The light source includes a plurality of light sources of a plurality of colors, the lighting periods of which are individually controllable. Each of the sub-frame periods includes a plurality of field periods each provided for a corresponding color of the colors. Each of the field periods includes a writing period of the line images and a display period in which the light is emitted from the light source. The line images are written in units of a predetermined number of lines during the writing period. The line images that are written at a time in units of the predetermined number of lines are the same line image. In continuous two of the field periods, when a line image to be written during the writing period in a preceding field period of the two field periods differs from a line image to be written during the writing period in a subsequent field period of the two field periods, a start position of the writing period in the preceding field period and a start position of the writing period in the subsequent field period are shifted by one line from each other. A polarity of an electric field between the two substrates is inverted at a cycle of two field periods.

BRIEF DESCRIPTION OF THE DRAWINGS

FIG. 6 is a table diagram illustrating an exemplary relation between a frame rate, a red-green-blue (RGB) light source lighting frequency, and a color breakup index;

FIG. 7 is a table diagram illustrating a relation between a luminance index and a light quantity of a light source 11 in each mode in the first embodiment;

FIG. 9 is a table diagram illustrating a relation between the luminance index and the light quantity of the light source 11 in each mode in the second embodiment;

FIG. 13 is a table diagram illustrating a relation between the luminance index and the light quantity of the light source 11 in each mode in the fourth embodiment;

FIG. 14 is another table diagram illustrating the relation between the luminance index and the light quantity of the light source 11 in each mode in the fourth embodiment; and FIG. 15 is a timing diagram illustrating an exemplary flow of the field sequential control including three sub-frame periods.

DETAILED DESCRIPTION

Figure 1:
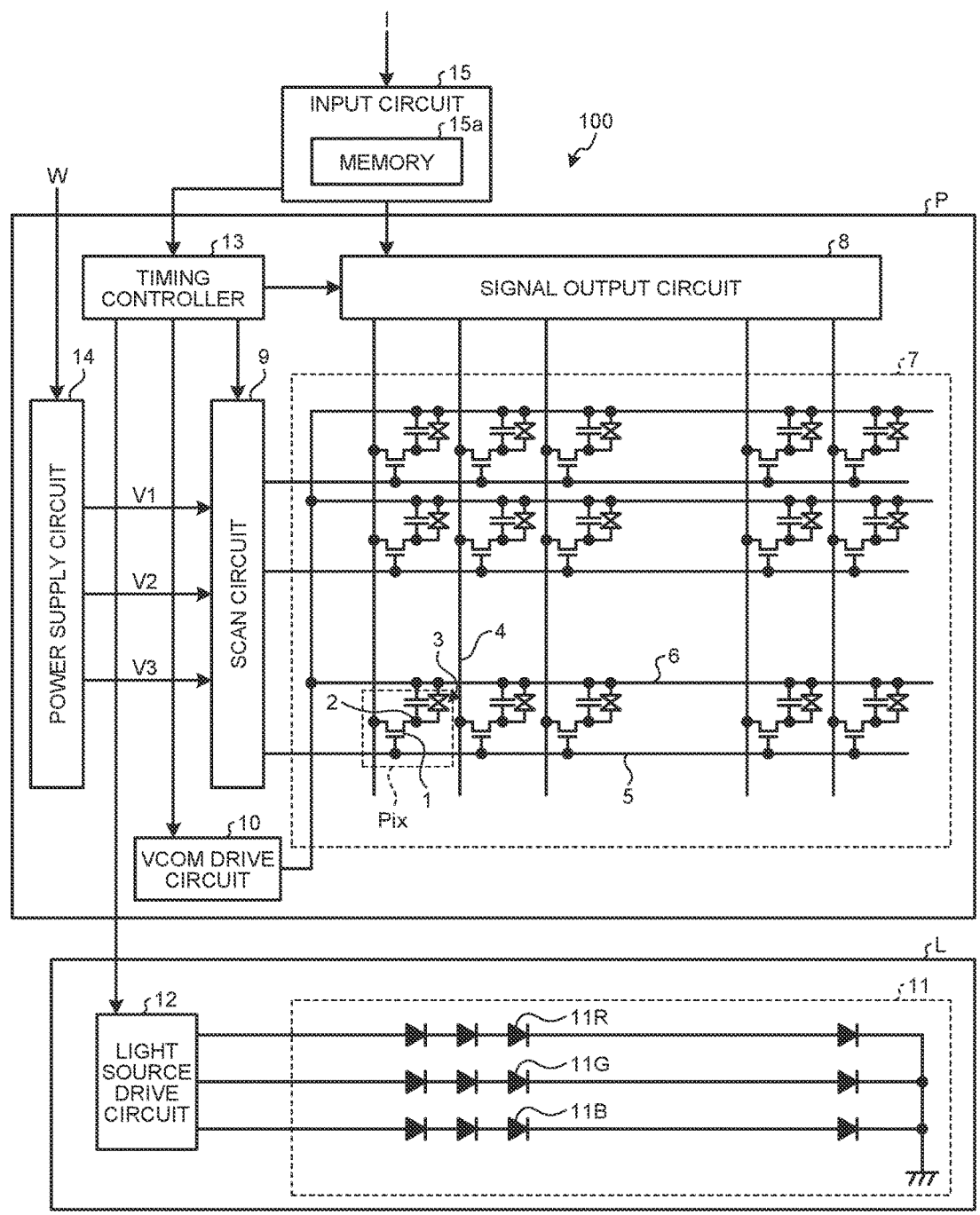
FIG. 1 is a schematic circuit diagram illustrating a main configuration of a display system.

The following describes embodiments of the present disclosure with reference to the drawings. What is disclosed herein is merely an example, and the present disclosure naturally encompasses appropriate modifications easily conceivable by those skilled in the art while maintaining the gist of the disclosure. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

First Embodiment

FIG. 1 is a schematic circuit diagram illustrating a main configuration of a display device 100. The display device 100 includes a liquid crystal display panel P and a light source device L. The liquid crystal display panel P includes a display part 7, a signal output circuit 8, a scan circuit 9, a VCOM drive circuit 10, a timing controller 13, and a power supply circuit 14. Hereinafter, one surface of the liquid crystal display panel P facing the display part 7 is referred to as a display surface, and the other surface thereof is referred to as a back surface. A lateral side of the display device 100 refers to a side located, with respect to the display device 100, in a direction intersecting (for example, orthogonal to) an opposing direction in which the display surface and the back surface are opposed to each other.

Figure 2:
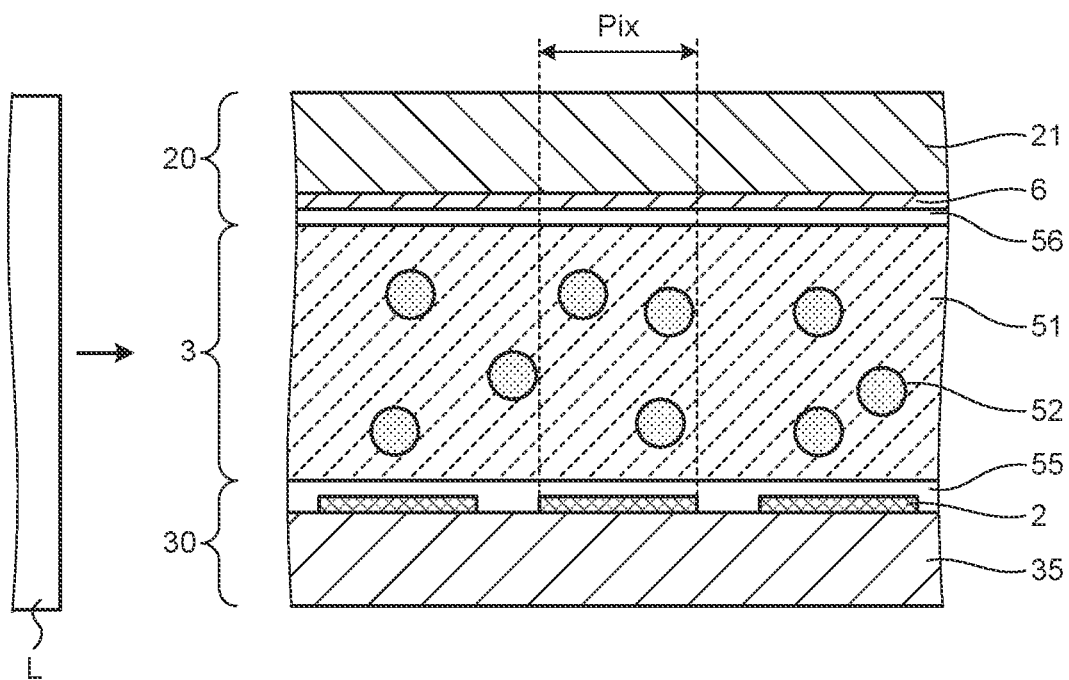
FIG. 2 is a schematic sectional view of a liquid crystal display panel.

A plurality of pixels Pix are arranged in a matrix in a row-column configuration in the display part 7. Each of the pixels Pix includes a switching element 1 and two electrodes. FIG. 1 and FIG. 2 to be explained below illustrate a pixel electrode 2 and a common electrode 6 as the two electrodes.

FIG. 2 is a schematic sectional view of the liquid crystal display panel P. The liquid crystal display panel P includes two substrates facing each other and a liquid crystal 3 filled between the two substrates. Hereinafter, one of the two substrates is referred to as a first substrate 30, and the other of the two substrates is referred to as a second substrate 20.

The first substrate 30 includes a light-transmitting glass substrate 35, the pixel electrode 2 stacked on the second substrate 20 side of the glass substrate 35, and an insulating layer 55 stacked on the second substrate 20 side thereof so as to cover the pixel electrode 2. The pixel electrode 2 is individually provided for each of the pixels Pix. The second substrate 20 includes a light-transmitting glass substrate 21, the common electrode 6 stacked on the first substrate 30 side of the glass substrate 21, and an insulating layer 56 on the first substrate 30 side thereof so as to cover the common electrode 6. The common electrode 6 has a plate-like or film-like shape shared among the pixels Pix.

The liquid crystal 3 according to a first embodiment is a polymer-dispersed liquid crystal. Specifically, the liquid crystal 3 contains a bulk 51 and fine particles 52. The fine particles 52 change in orientation in the bulk 51 in accordance with a potential difference between the pixel electrode 2 and the common electrode 6. The potential of the pixel electrode 2 is individually controlled for each of the pixels Pix, and thereby, the degree of at least one of optical transmission and dispersion is controlled for each of the pixels Pix.

In the first embodiment described with reference to FIG. 2, the pixel electrode 2 faces the common electrode 6 so as to interpose the liquid crystal 3 therebetween. However, the liquid crystal display panel P may have a configuration in which the pixel electrode 2 and the common electrode 6 are provided on one substrate, and the orientation of the liquid crystal 3 is controlled by an electric field generated by the pixel electrode 2 and the common electrode 6. In addition, the liquid crystal 3 may be a liquid crystal other than the polymer-dispersed liquid crystal.

The following describes a mechanism for controlling the potentials of the pixel electrode 2 and the common electrode 6. As illustrated in FIG. 1, the switching element 1 is a switching element using, for example, a semiconductor, such as a thin-film transistor (TFT). One of the source and the drain of the switching element 1 is coupled to one of the two electrodes (pixel electrode 2). The other of the source and the drain of the switching element 1 is coupled to a signal line 4. The gate of the switching element 1 is coupled to a scan line 5. The scan line 5 applies a potential for opening or closing a circuit between the source and the drain of the switching element 1 under the control of the scan circuit 9. The scan circuit 9 controls the potential.

In the example illustrated in FIG. 1, the signal lines 4 are arranged along one of the arrangement directions (row direction) of the pixels Pix. The signal lines 4 extend along the other of the arrangement directions (column direction) of the pixels Pix. Each of the signal lines 4 is shared by corresponding ones of the switching elements 1 of the pixels Pix arranged in the column direction. The scan lines 5 are arranged along the column direction. The scan lines 5 extend along the row direction. Each of the scan lines 5 is shared by corresponding ones of the switching elements 1 of the pixels Pix arranged in the row direction.

The common electrode 6 is coupled to the VCOM drive circuit 10. The VCOM drive circuit 10 applies a potential serving as a common potential to the common electrode 6. At a time when the scan circuit 9 applies a potential serving as a drive signal to the scan line 5, the signal output circuit 8 outputs a gradation signal (to be described later) to the signal line 4 so as to charge the liquid crystal (fine particles 52) serving as a storage capacitor and a capacitive load provided between the pixel electrode 2 and the common electrode 6. This operation sets the voltage of the pixel Pix to a voltage corresponding to the gradation signal. After the drive signal is stopped being applied, the liquid crystal (fine particles 52) serving as the storage capacitor and the capacitive load holds the gradation signal. The orientation of the liquid crystal (fine particles 52) is controlled according to the electric field generated by the voltage of each of the pixels Pix and the voltage of the common electrode 6.

As illustrated in FIGS. 1 and 2, the light source 11 is disposed on a lateral side of the liquid crystal display panel P. The light source 11 includes a first light source 11R that emits red light, a second light source 11G that emits green light, and a third light source 11B that emits blue light. Each of the first light source 11R, the second light source 11G, and the third light source 11B emits the light under the control of a light source drive circuit 12. Each of the first light source 11R, the second light source 11G, and the third light source 11B of the first embodiment is a light source using, for example, a light-emitting element such as a light-emitting diode (LED), but is not limited thereto, and only needs to be a light source the light emission timing of which is controllable. The light source drive circuit 12 controls the light emission timing of the first light source 11R, the second light source 11G, and the third light source 11B under the control of the timing controller 13.

The timing controller 13 controls the operation timing of the signal output circuit 8, the scan circuit 9, the VCOM drive circuit 10, and the light source drive circuit 12. In the first embodiment, field sequential control is performed.

Figure 3:
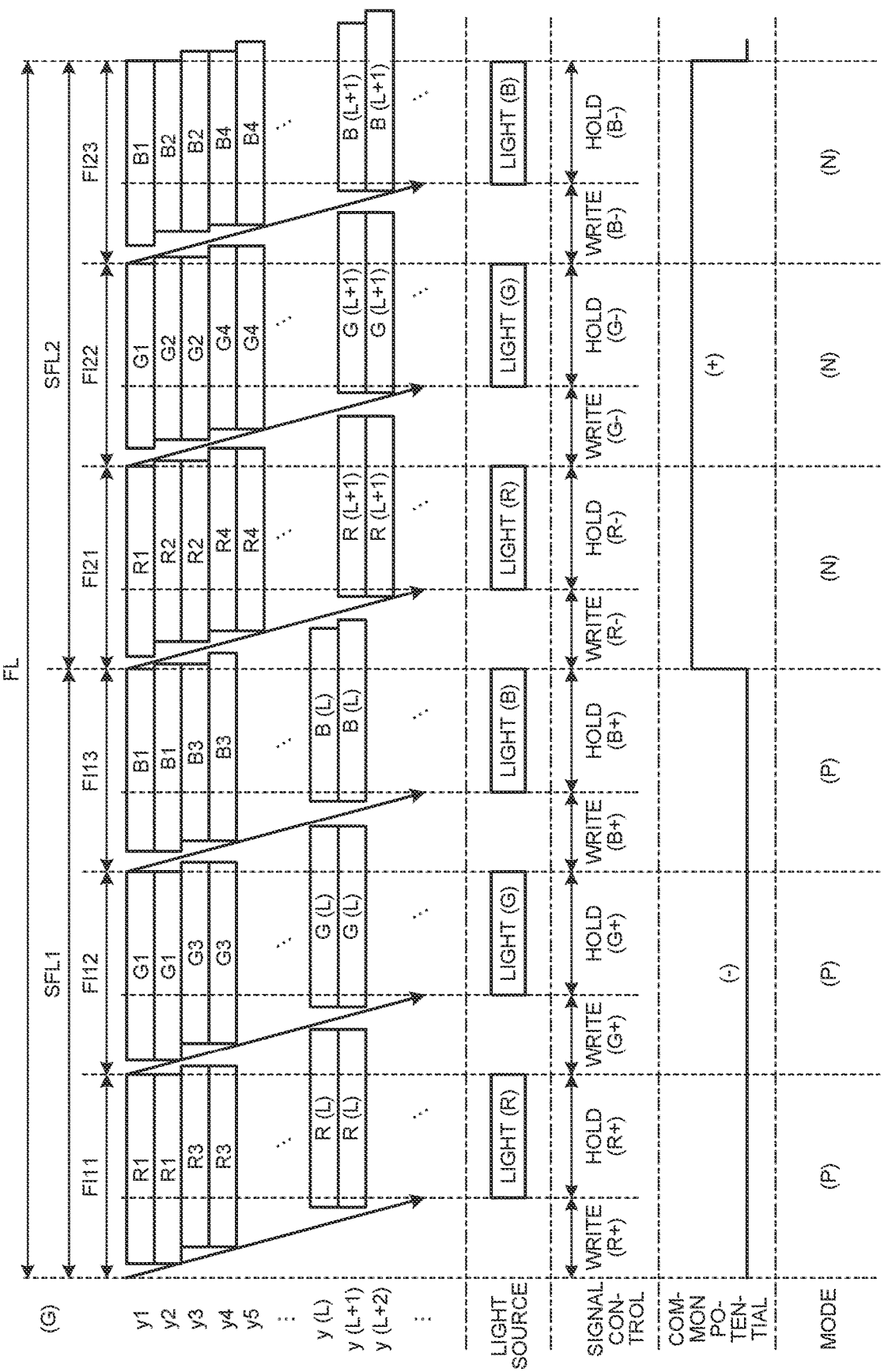
FIG. 3 is a timing diagram illustrating an exemplary flow of field sequential control according to a first embodiment.

FIG. 3 is a timing diagram illustrating an exemplary flow of the field sequential control according to the first embodiment. FIG. 3 illustrates a relation among the frame period FL, sub-frame periods (a first sub-frame period SFL1 and a second sub-frame period SFL2), and field periods FI11, FI12, FI13, FI21, FI22, and FI23. FIG. 3 also illustrates lighting timing of the light source 11 (the first light source 11R, the second light source 11G, and the third light source 11B) in the field periods FI11, FI12, FI13, FI21, FI22, and FI23, signal control for the signal lines 4 and the scan lines 5, the potential (common potential) applied to the common electrode 6 by the VCOM drive circuit 10, and modes determined in accordance with a potential difference (polarity) between the pixel electrode 2 and the common electrode 6. The timing diagram of FIG. 3 and other figures exemplarily illustrates one frame period FL. In reality, however, the same frame period FL is periodically repeated.

The frame period FL is a period during which a frame image is displayed. One frame image is displayed during the one frame period FL. In the first embodiment, the one frame period FL includes two sub-frame periods of the first sub-frame period SFL1 and the second sub-frame period SFL2.

In the first embodiment, each of the sub-frame periods includes field periods. FIG. 3, for example, illustrates three field periods FI11, FI12, and FI13 included in the first sub-frame period SFL1 and three field periods FI21, FI22, and FI23 included in the second sub-frame period SFL2.

The number of the field periods included in one sub-frame period corresponds to the number of colors of the light source 11. In the first embodiment, the number of colors of the light source 11 including the first light source 11R, the second light source 11G, and the third light source 11B is three. Thus, the one sub-frame period of the first embodiment includes three field periods. The number and types of colors of the light source 11 and the number of the field periods included in the one sub-frame period in the first embodiment are merely examples and are not limited to those cited above, and can be changed as appropriate.

The display device 100 alternately executes a writing period of the gradation signals for the pixels Pix provided in the display part 7 and a holding period of the gradation signals, and displays an image by lighting the light source 11 during the holding period. Hereinafter, the term simply called "writing period" refers to the writing period of the gradation signals to the pixels Pix provided in the display part 7. In addition, the term simply called "holding period" refers to the holding period of the gradation signals to the pixels Pix provided in the display part 7.

The writing period is a period in which the signal control is performed to turn on the TFTs provided in the pixels Pix by causing the scan circuit 9 to output the drive signals to the scan lines 5, and write the gradation signals to the pixels Pix by causing the signal output circuit 8 to output the gradation signals to the signal lines 4. The holding period is a period in which the signal control is performed to turn off all the TFTs and hold the voltages written during the writing period. Each of the field periods includes the writing period and the holding period after the writing period.

In FIG. 3, WRITE (R+) represents the writing period in the field period FI11; HOLD (R+) represents the holding period in the field period FI11; WRITE (G+) represents the writing period in the field period FI12; HOLD (G+) represents the holding period in the field period FI12; WRITE (B+) represents the writing period in the field period FI13; HOLD (B+) represents the holding period in the field period FI13; WRITE (R−) represents the writing period in the field period FI21; HOLD (R−) represents the holding period in the field period FI21; WRITE (G−) represents the writing period in the field period FI22; HOLD (G−) represents the holding period in the field period FI22; WRITE (B−) represents the writing period in the field period FI23; and HOLD (B−) represents the holding period in the field period FI23.

The first embodiment employs a time-division color display output system (field-sequential color (FSC) system) in which light sources of different colors (such as the first light source 11R, the second light source 11G, and the third light source 11B) are lit during the respective field periods in the one sub-frame period.

Specifically, in the first embodiment, the gradation signals corresponding to gradation values of the different colors are written during the respective field periods included in the one sub-frame period. For example, a pixel signal is assumed as a signal for each of the pixels Pix included in an input signal I (refer to FIG. 1) received from outside the display device 100 as a signal representing red-green-blue (RGB) gradation values assigned to one of the pixels during the one frame period. The pixel signal is represented as (R, G, B)=(r1, g1, b1) when expressed as RGB gradation values. r1 represents a gradation value of red (R) in the input signal including the information representing the RGB gradation values. g1 represents a gradation value of green (G) in the input signal including the information representing the RGB gradation values. b1 represents a gradation value of blue (B)

in the input signal including the information representing the RGB gradation values. In this case, a gradation signal corresponding to the gradation value of "r1" is written in the writing period in the field period FI11; a gradation signal corresponding to the gradation value of "g1" is written in the writing period in the field period FI12; and a gradation signal corresponding to the gradation value of "b1" is written in the writing period in the field period FI13. During the holding periods included in the respective field periods, the gradation signals corresponding to the gradation values of the different colors written in the writing periods as described above are held, respectively. The writing and holding of the gradation signal in each of the field periods are individually performed in each of the pixels Pix. The FSC has been described by way of the example of the signal control during the first sub-frame period SFL1. The signal control in each of the field periods FI21, FI22, and FI23 during the second sub-frame period SFL2 is the same as the signal control in each of the field periods FI11, FI12, and FI13 during the first sub-frame period SFL1.

Each of the light sources of a plurality of colors (such as the first light source 11R, the second light source 11G, and the third light source 11B) included in the light source 11 is controlled to be lit in the holding period in a corresponding one of the field periods. In the first embodiment, the first light source 11R is a red light source; the second light source 11G is a green light source; and the third light source 11B is a blue light source. In, for example, FIG. 3, "LIGHT (R)" represents the lighting timing of the first light source 11R. In, for example, FIG. 3, "LIGHT (G)" represents the lighting timing of the second light source 11G. In, for example, FIG. 3, "LIGHT (B)" represents the lighting timing of the third light source 11B. In this manner, the light source 11 is lit to display the image during the holding period. Thus, the holding period serves as a display period of the image.

In the liquid crystal display panel P using the liquid crystal, an inversion drive is performed to invert a relative potential level between a potential of one of the two electrodes and a potential of the other thereof at a predetermined cycle. In, for example, FIG. 3, a plus sign (+) and a minus sign (−) each indicate the relative potential level between the potential of the pixel electrode 2 given by the writing of the gradation signal performed in the writing period and the common potential, that is, the potential given to the common electrode 6 by the VCOM drive circuit 10. In, for example, FIG. 3, the plus sign (+) indicates a relatively higher potential, and the minus sign (−) indicates a relatively lower potential.

For example, in the first sub-frame period SFL1 illustrated in FIG. 3, the common potential is minus (−). In contrast, in the writing periods (WRITE (R+), WRITE (G+), and WRITE (B+)) and the holding periods (HOLD (R+), HOLD (G+), and HOLD (B+)) in each of the field periods in the first sub-frame period SFL1, the sign "+" in parentheses indicates that potential is the plus (+), which indicates relatively higher than the common potential with the minus sign (−). In the second sub-frame period SFL2 illustrated in FIG. 3, the plus (+) and the minus (−) are indicated to have been inverted from those in the first sub-frame period SFL1. In this manner, in the first embodiment, the polarity of the electric field between the two substrates (the polarity of the electric field between the pixel electrode 2 and the common electrode 6) is inverted at a cycle of the sub-frame period.

In, for example, FIG. 3, in the relation of the polarity of the electric field between the pixel electrode 2 and the common electrode 6, the state where the pixel electrode 2 is plus (+) and the common electrode 6 is minus (−) is illustrated as positive (P), and the state where the pixel electrode 2 is minus (−) and the common electrode 6 is plus (+) is illustrated as negative (N). In the following description, when the term "positive (P) mode" or "negative (N) mode" is mentioned, the description indicates the relation of the polarity of the electric field between the pixel electrode 2 and the common electrode 6.

In the example illustrated in FIG. 3, the first sub-frame period SFL1 is in the positive (P) mode, and the second sub-frame period SFL2 is in the negative (N) mode. However, the order of the modes may be reversed. That is, the first sub-frame period SFL1 may be in the negative (N) mode, and the second sub-frame period SFL2 may be in the positive (P) mode.

As described above, during the writing period, the signal control is performed to turn on the TFTs provided in the pixels Pix by causing the scan circuit 9 to output the drive signals to the scan lines 5 and write the gradation signals to the pixels Pix by causing the signal output circuit 8 to output the gradation signals to the signal lines 4. Thus, the gradation signals are simultaneously written to the pixels Pix included in a pixel row that is coupled to a common one of the scan lines 5 and is simultaneously turned on in response to the drive signal to the scan line 5. When the term "line image" refers to an image that is written by the pixel row coupled to the common scan line 5 as described above, the frame image is made up of the line images arranged along the arrangement direction of the scan lines 5.

The pixels Pix coupled to a common one of the signal lines 4 are coupled to different ones of the scan lines 5. By supplying the drive signals to more than one of the scan lines 5 at the same time, the gradation signal given to a signal line 4 can be written at the same time to the pixels Pix that are coupled to the more than one of the scan lines 5 supplied with the drive signals at the same time and are coupled to the signal line 4. Thus, when the line images are written at a time to more than one of the pixel rows by supplying the drive signals to more than one of the scan lines 5, the line images in the pixel rows that are written at a time are the same line image. The line image is an image output to be displayed by the pixels Pix arranged along the extending direction of the scan line 5 (arrangement direction of the signal lines 4).

Based on the relation among the signal lines 4, the scan lines 5, and the pixels Pix as described above, the display device 100 writes the line images in units of a predetermined number of lines in the writing period. A predetermined number of line images that are written in units of the predetermined number of lines are the same line image. The predetermined number is a natural number equal to or larger than two and corresponds to the number of sub-frames. In two sub-frame periods that are continuous in the one frame period, when a line image (first line image) to be written in the writing period in the preceding sub-frame period differs from a line image (second line image) to be written in the writing period in the subsequent sub-frame period, the start position of the writing period in the preceding sub-frame period and the start position of the writing period in the subsequent sub-frame period are shifted by one line from each other. Specifically, the start positions of writing of the line images based on the pixel signals different between the writing periods in the two continuous sub-frame periods in the one frame period are shifted by one line from each other. The first line image and the second lime image are, for example, the line images based on the same frame image that are different from each other in the position of the pixel row in the input signal I.

In the timing diagram of, for example, FIG. 3, the positional relation between the pixel rows coupled to the different scan lines 5 is indicated by combining "y" with one of "numbers (1, 2, 3, 4, 5, . . . , (L), (L+1), (L+2), . . . )". "y1" denotes the pixel row located on one end side in the arrangement direction of the scan lines 5 in the display part 7. Thus, the pixel rows are arranged in the order of y1, y2, y3, y4, y5, . . . , y(L), y(L+1), y(L+2), . . . .

The scan circuit 9 performs scanning by repeating processes of supplying the drive signals to some of the scan lines 5 while switching the scan lines 5 to be supplied with the drive signals. The scan circuit 9 of the first embodiment switches the scan lines 5 to be supplied with the drive signals from one end side to the other end side in the arrangement direction of the scan lines 5.

As described above, in the first embodiment, the gradation signals corresponding to the gradation values of the different colors are written in the respective field periods included in the one sub-frame period. In the timing diagram of FIG. 3 and other figures, a rectangle indicates a line image given to each of the pixel rows y1, y2, y3, y4, y5, . . . , y(L), y(L+1), y(L+2), . . . in each of the field periods, and a symbol (R, G, or B) representing a color indicates a color corresponding to the individual line image. In addition, in the timing diagram of FIG. 3 and other figures, a number illustrated on a side (right side) of the symbol (R, G, or B) representing a color indicates a number corresponding to the position of each of the line images constituting the input signal I. For example, the rectangle of "R1" indicates a line image reflecting a gradation value of red (R) among the line images given to the pixel row in the position of "y1" in the input signal I; the rectangle of "G3" indicates a line image reflecting a gradation value of green (G) among the line images given to the pixel row in the position of "y3" in the input signal I; and the rectangle of "B(L)" indicates a line image reflecting a gradation value of blue (B) among the line images given to the pixel row in the position of "y(L)" in the input signal I. The same rule applies to the description of a combination of the "symbol (R, G, or B) representing a color" with one of the "numbers (1, 2, 3, 4, 5, . . . , (L), (L+1), (L+2), . . . )" in each of the other rectangles. The number L of the "numbers (1, 2, 3, 4, 5, . . . , (L), (L+1), (L+2), . . . )" is an odd natural number equal to or larger than three.

In the first embodiment, the line image is written in units of two lines during the writing period. Specifically, in the first sub-frame period SFL1, the line images given to the pixel rows in the first row, the third row, . . . , the (L)-th row, . . . among the line images included in the input signal I are written in units of two lines adjacent to each other, and in the second sub-frame period SFL2, the line images given to the pixel rows in the second row, the fourth row, . . . , the (L+1)-th row, . . . among the line images included in the input signal I are written in units of two lines adjacent to each other. The start positions of writing of the line images based on the pixel signals different between the writing periods in each of the two sub-frame periods are shifted by one line from each other. The term "line images based on different pixel signals" refers to line images that are different in position among the line images included in the input signal I. That is, the line image in the "first row" and the line image in the "second row" among the line images included in the input signal I are the "line images based on the different pixel signals".

As illustrated in FIG. 3, line images reflecting "R1", "G1", and "B1" corresponding to the gradation values of red (R), green, (G), and blue (B) of the line images of the first row among the line images included in the frame image are written to the pixel rows of "y1" and "y2" in the writing periods in the field periods FI11, FI12, and FI13 included in the first sub-frame period SFL1. In addition, line images reflecting "R3", "G3", and "B3" corresponding to the gradation values of red (R), green, (G), and blue (B) of the line images of the third row among the line images included in the frame image are written to the pixel rows of "y3" and "y4" in the writing periods in the field periods FI11, FI12, and FI13 included in the first sub-frame period SFL1. Line images are also written to the other pixel rows based on the same mechanism. Thus, line images reflecting "R(L)", "G(L)", and "B(L)" corresponding to the gradation values of red (R), green, (G), and blue (B) of the line images of the (L)-th row among the line images included in the frame image are written to the pixel rows of "y(L)" and "y(L+1)" in the writing periods in the field periods FI11, FI12, and FI13 included in the first sub-frame period SFL1.

Line images reflecting "R2", "G2", and "B2" corresponding to the gradation values of red (R), green, (G), and blue (B), respectively, of the line images of the second row among the line images included in the frame image are written to the pixel rows of "y2" and "y3" in the writing periods in the field periods FI21, FI22, and FI23 included in the second sub-frame period SFL2. In this manner, while the start position of writing of the line images is "y1" in the first sub-frame period SFL1, the start position of writing of the line images is "y2" in the second sub-frame period SFL2, and thus, is shifted by one line. Thereafter, the writing position of the line images to be written in units of two lines during the writing periods in the field periods FI21, FI22, and FI23 included in the second sub-frame period SFL2 is shifted by one line with respect to the first sub-frame period SFL1.

Specifically, line images reflecting "R4", "G4", and "B4" corresponding to the gradation values of red (R), green, (G), and blue (B) of the line images of the fourth row among the line images included in the frame image are written to the pixel rows of "y4" and "y5" in the writing periods in the field periods FI21, FI22, and FI23 included in the second sub-frame period SFL2. Line images are also written to the other pixel rows based on the same mechanism. Thus, line images reflecting "R(L+1)", "G(L+1)", and "B(L+1)" corresponding to the gradation values of red (R), green, (G), and blue (B) of the line images of the (L+1)-th row among the line images included in the frame image are written to the pixel rows of "y(L+1)" and "y(L+2)" in the writing periods in the field periods FI21, FI22, and FI23 included in the second sub-frame period SFL2.

Line images that do not correspond to the "line images based on the different pixel signals" are written to the same position even in different sub-frame periods. Specifically, even in the writing periods in the field periods FI21, FI22, and FI23 included in the second sub-frame period SFL2, the line images reflecting "R1", "G1", and "B1" corresponding to the gradation values of red (R), green, (G), and blue (B) of the line images of the first row are written to the pixel row of "y1" in the writing periods in the field periods FI21, FI22, and FI23 included in the second sub-frame period SFL2. That is, in the pixel row of "y1", the writing and the display output are performed based on the line images based on the pixel signals in the position of "y1" common to both the first sub-frame period SFL1 and the second sub-frame period SFL2.

When viewed on a frame period FL basis, components of the line images output to be displayed in each pixel row are obtained by combining components of the line images written in the first sub-frame period SFL1 with components of the line images written in the second sub-frame period SFL2.

Figures 4, 5:
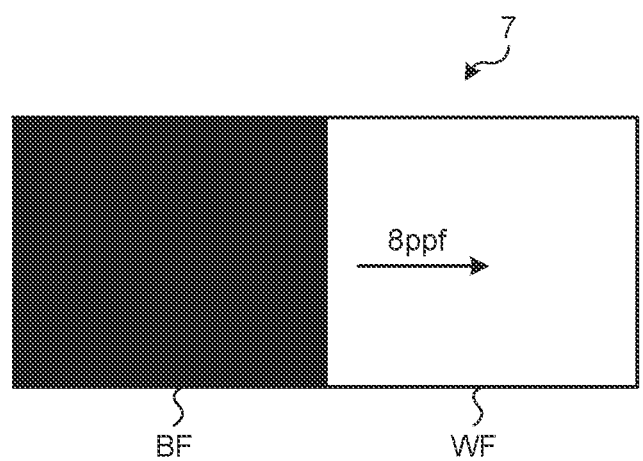
FIG. 4 is a table diagram illustrating components of line images output to be displayed in each pixel row during a frame period FL in the first embodiment.
FIG. 5 is an explanatory diagram of a test pattern related to occurrence of color breakup.

FIG. 4 is a table diagram illustrating the components of the line images output to be displayed in each pixel row during the frame period FL in the first embodiment. As described with reference to FIG. 3, the line images that are written to two pixel rows at a time are the same line image. As described above, in the pixel row of "y1", the writing and the display output are performed based on the line images based on the pixel signals in the position of "y1" common to both the first sub-frame period SFL1 and the second sub-frame period SFL2. Thus, the component of the line image output to be displayed in the pixel row of "y1" is "RGB1" obtained by combining "R1", "G1", and "B1" of the field periods in the first sub-frame period SFL1 and those in the second sub-frame period SFL2.

However, in pixel rows other than the pixel row of "y1", the line images to be written in the first sub-frame period SFL1 and the second sub-frame period SFL2 differ from each other. For example, in the pixel row of "y2", the writing and the display output are performed based on the line images based on the pixel signals in the position of "y1" in the first sub-frame period SFL1. Also, in the pixel row of "y2", the writing and the display output are performed based on the line images based on the pixel signals in the position of "y2" in the second sub-frame period SFL2. Thus, the component of the line image output to be displayed in the pixel row of "y2" is "(RGB1+RGB2)/2" obtained by dividing, by the number of sub-frame periods (two in the first embodiment), a component obtained by adding "RGB1" obtained by combining "R1", "G1", and "B1" of the respective field periods in the first sub-frame period SFL1 to "RGB2" obtained by combining "R2", "G2", and "B2" of the respective field periods in the second sub-frame period SFL2.

Based on the same mechanism as that of the pixel row of "y2" described above, the component of the line image output to be displayed in each of the pixel rows other than the pixel row of "y1" is obtained by dividing, by the number of sub-frame periods, a component obtained by adding a component of each of the line images written in the respective field periods in the first sub-frame period SFL1 to a component of each of the line images written in the respective field periods in the second sub-frame period SFL2.

For example, the component of the line image output to be displayed in the pixel row of "y(L)" is "{RGB(L−1)+RGB(L)}/2" obtained by dividing, by the number of sub-frame periods (two in the first embodiment), a component obtained by adding "RGB(L−1)" obtained by combining "R(L−1)", "G(L−1)", and "B(L−1)" in the respective field periods in the first sub-frame period SFL1 to "RGB(L)" obtained by combining "R(L)", "G(L)", and "B(L)" in the respective field periods in the second sub-frame period SFL2. Also, the component of the line image output to be displayed in the pixel row of "y(L+1)" is "{RGB(L)+RGB(L+1)}/2" obtained by dividing, by the number of sub-frame periods (two in the first embodiment), a component obtained by adding "RGB(L)" obtained by combining "R(L)", "G(L)", and "B(L)" in the respective field periods in the first sub-frame period SFL1 to "RGB(L+1)" obtained by combining "R(L+1)", "G(L+1)", and "B(L+1)" in the respective field periods in the second sub-frame period SFL2. Also, the component of the line image output to be displayed in the pixel row of "y(L+2)" is "RGB(L+1)+RGB(L+2)}/2" obtained by dividing, by the number of sub-frame periods (two in the first embodiment), a component obtained by adding "RGB(L+1)" obtained by combining "R(L+1)", "G(L+1)", and "B(L+1)" in the respective field periods in the first sub-frame period SFL1 to "RGB(L+2)" obtained by combining "R(L+2)", "G(L+2)", and "B(L+2)" in the respective field periods in the second sub-frame period SFL2.

As described above, the line image given to the (L)-th pixel row among the line images included in the input signal I is output to be displayed in the one frame period by being output to be displayed in the pixel row of "y(L)" during ½ frame period and being output to be displayed in the pixel row of "y(L+1)" during ½ frame period. Also, the line image given to the (L+1)-th pixel row among the line images included in the input signal I is output to be displayed in the one frame period by being output to be displayed in the pixel row of "y(L+1)" during ½ frame period and being output to be displayed in the pixel row of "y(L+2)" during ½ frame period.

As described above, the predetermined number of line images that are written at a time in units of the predetermined number of lines are the same line image, and the start positions of writing of the line images based on the pixel signals different between the writing periods in the two continuous sub-frame periods in the one frame period are shifted by one line from each other. Thereby, the frequency of switching of the output target (scan line 5) of the drive signal by scanning by the scan circuit 9 can be restrained from increasing while increasing the frequency of switching of the display output images. Such increase in the frequency of switching of the display output images can reduce occurrence of color breakup.

FIG. 5 is an explanatory diagram of a test pattern related to the occurrence of the color breakup. For example, as illustrated in FIG. 5, a starting state is defined as a state where the display part 7 performs the display output in which an area (black area BF) having the lowest degree of scattering of light is adjacent to an area (white area WF) having the highest degree of scattering of light. With reference to FIG. 6 to be explained below, an example will be described in which the degree of occurrence of the color breakup is determined in a case where control (by 8 pixels per frame (8 ppf)) that causes the display output image to change is applied to widen the black area BF from the starting state toward the white area WF by a width of eight pixels and narrow the white area WF by that amount in each frame period FL.

FIG. 6 is a table diagram illustrating an exemplary relation between a frame rate, an RGB light source lighting frequency, and a color breakup index (CBI). The term "frame rate" refers to the number of the frame periods FL per second. The term "RGB light source lighting frequency" refers to the number of cycles per second of lighting periods of the first light source 11R, the second light source 11G, and the third light source 11B included in the light source 11. Thus, the number of times of lighting per second of each of the first light source 11R, the second light source 11G, and the third light source 11B included in the light source 11 is the same as the RGB light source lighting frequency. The value of the frequency at which a light source of any one of the colors included in the light source 11 is lit is a value obtained by multiplying the RGB light source lighting frequency by the number of colors (three). The CBI is an index derived based on a calculation method for measuring the color breakup proposed by Semiconductor Equipment and Materials International (SEMI). A smaller value of the CBI indicates that the color breakup is more difficult to be viewed.

As illustrated in FIG. 6, when the frame rate and the RGB light source lighting frequency are increased such that the frame rate is equal to the RGB light source lighting frequency, the CBI is more improved than in a case where the RGB light source lighting frequency is increased while fixing the frame rate at 60 [Hz]. For this reason, in the first embodiment, the frame rate is set to be equal to the RGB light source lighting frequency, and the frame rate and the RGB light source lighting frequency are set to a value exceeding 60 [Hz] (for example, to 120 [Hz] or 240 [Hz]). The relation between the frame rate and the RGB light source lighting frequency can be set to any relation by setting each of the frame rate and the RGB light source lighting frequency to any value.

When other conditions on the display output are the same, the luminance of the display output image that is output by the display part 7 may differ between a positive (P) mode and a negative (N) mode. The reason why the luminance difference occurs between the positive (P) mode and the negative (N) mode is that an intermediate potential between a potential given to the common electrode 6 by the VCOM drive circuit 10 in the positive (P) mode and a potential given to the common electrode 6 by the VCOM drive circuit 10 in the negative (N) mode is technically difficult to be set to 0 [V]. That is, the luminance difference may occur because the absolute values of potentials of various parts in the positive (P) mode and the absolute values of the potentials of the various parts in the negative (N) mode vary. Therefore, the light quantity of the light source 11 in the positive (P) mode may be set to be different from the light quantity of the light source 11 in the negative (N) mode.

FIG. 7 is a table diagram illustrating a relation between a luminance index and the light quantity of the light source 11 in each mode in the first embodiment. The luminance index is the luminance of the display part 7 obtained when a set of gradation values for setting the luminance to the maximum is given to all the pixels Pix of the display part 7 with respect to the luminance serving as a reference (±0) obtained when a set of predetermined gradation values is given to all the pixels Pix of the display part 7. The set of predetermined gradation values is, for example, a set of 8-bit gradation values of the RGB colors represented as (R, G, B)=(128, 128, 128), and the set of gradation values for setting the luminance to the maximum is, for example, a set of 8-bit gradation values of the RGB colors represented as (R, G, B)=(255, 255, 255). However, the present disclosure is not limited thereto.

For example, the display device 100 of the first embodiment is placed in the positive (P) mode during the first sub-frame period SFL1 and is placed in the negative (N) mode during the second sub-frame period SFL2. In the example illustrated in FIG. 7, the luminance index of the display part 7 is $\alpha$ in the positive (P) mode and is $\beta$ in the negative (N) mode. When $\alpha$ differs from $\beta$, the light quantity (K) of the light source 11 in the positive (P) mode is set to be different from the light quantity (A) of the light source 11 in the negative (N) mode. In this case, $\kappa$ and $\lambda$ are set such that, for example, the luminance of the display part 7 obtained when the set of gradation values for setting the luminance to the maximum is given to all the pixels Pix of the display part 7 is substantially the same in both the positive (P) mode and the negative (N) mode.

In the display device 100 using the polymer-dispersed liquid crystal described with reference to FIGS. 1 and 2, the luminance index tends to be such that $\alpha > \beta$. Thus, when $\alpha > \beta$ because of, for example, the difference between the potential given to the common electrode 6 by the VCOM drive circuit 10 in the positive (P) mode and the potential given to the common electrode 6 by the VCOM drive circuit 10 in the negative (N) mode described above, the relation holds such that $\kappa < \lambda$. However, the relation between a and R and the relation between K and A are not limited to the above-described relations, and both the relations may be reversed. The luminance difference between the positive (P) mode and the negative (N) mode can be reduced by setting the relation between $\kappa$ and $\lambda$ as appropriate depending on the relation between a and $\beta$. The relation may naturally be such that $\kappa = \lambda$ when $\alpha = \beta$. In this case, the light quantity of the light source 11 need not be controlled in a particular way.

For example, an input circuit 15 performs output control of the line images to be written in the writing period. The input circuit 15 outputs the gradation signals representing the gradation values of the colors of red (R), green (G), and blue (B) of each of the pixels Pix to the signal output circuit 8 based on the input signal I. The input circuit 15 outputs a synchronization signal in synchronization with the input timing of the gradation signals to the signal output circuit 8 and other control signals to the timing controller 13. The timing controller 13 controls operations of, for example, the signal output circuit 8, the scan circuit 9, and the VCOM drive circuit 10 based on the signals received from the input circuit 15.

The input circuit 15 of the first embodiment is, for example, a field-programmable gate array (FPGA) or a circuit capable of performing the same function mounted on a flexible printed circuit board (not illustrated) coupled to the liquid crystal display panel P. The input circuit 15 includes a memory 15a for holding data of the frame image. The input circuit 15 outputs the line images from the frame image stored in the memory 15a, on a line image basis during the writing period in each of the field periods as described with reference to FIG. 3, for example. In other words, the memory 15a only needs to have a storage capacity capable of outputting the line images in the order described with reference to FIG. 3, for example. For example, if the memory 15a has a capacity capable of storing two frames of frame image, the input circuit 15 can output previously received one frame of frame image on a line image basis and can also hold the subsequent one frame of frame image received in parallel during the output period of the line image.

As described above, according to the first embodiment, the display device 100 includes the liquid crystal display panel P that includes the liquid crystal 3 filled between the two substrates facing each other and displays the frame image by arranging the line images in a scan direction, and the light source 11 that emits light to the liquid crystal display panel P. The one frame period FL assigned to the one frame image includes a predetermined number (for example, two) of sub-frame periods. The sub-frame period includes the writing period of the line images and the display period in which the light is emitted from the light source 11. During the writing period, the line images are written in units of a predetermined number of lines. The predetermined number of line images that are written at a time in units of the predetermined number of lines are the same line image. In the two sub-frame periods that are continuous in the one frame period, when a line image to be written in the writing period in the preceding sub-frame period differs from a line image to be written in the writing period in the subsequent sub-frame period, the start position of the writing period in the preceding sub-frame period and the start position of the writing period in the subsequent sub-frame period are shifted by one line from each other.

As a result, the number of times of switching of the scan lines 5 through which the scan circuit 9 outputs the drive signals in one writing period can be reduced as compared with a case where the different line images are sequentially written in the scan direction on a pixel row basis during the writing period. Consequently, time allocated to one writing period can be shortened. The one frame period is provided with a predetermined number of sub-frame periods, and the line images to be written and the start position of writing of the line images are changed on a sub-frame period basis. Thereby, the display output image of the frame image for each frame period can be substantially maintained while increasing the frame rate by providing the sub-frame periods. That is, by providing the predetermined number of sub-frame periods and shifting the line images, the frame rate can be increased while substantially maintaining the display output image. Therefore, according to the first embodiment, the frame rate can be increased, and thereby, the color breakup can be reduced.

A line image that is written in the subsequent sub-frame period (such as the second sub-frame period SFL2) of the two continuous sub-frame periods in the one frame period and is located on an upper stream side in the scan direction of the start position of the line images based on the different pixel signals, is the same as a line image that is written in the preceding sub-frame period (such as the first sub-frame period SFL1) of the two continuous sub-frame periods. As a result, the display output image for each frame period can more easily appear to be equal to that of the input signal I than in a case where all the line images are changed on a sub-frame period basis.

The light source 11 includes the light sources of a plurality of colors (such as the first light source 11R, the second light source 11G, and the third light source 11B) the lighting periods of which are individually controllable. The sub-frame period includes a plurality of field periods each provided for a corresponding one of the colors. Each of the field periods includes the writing period and the display period. This configuration can increase the frame rate in the display device 100 that performs the FSC display operation, whereby the color breakup can be reduced.

The polarity of the electric field between the two substrates (such as the first substrate 30 and the second substrate 20) is inverted at a cycle of a predetermined period (for example, the sub-frame period). This operation can reduce the deterioration of the liquid crystal 3.

By changing the light quantity of the light source 11 between before and after the inversion of the polarity of the electric field, the luminance of a viewed image can be made more uniform even when the luminance index is changed depending on different modes.

Second Embodiment

The following describes the display device according to a second embodiment. With regard to the description of the second embodiment, the same components as those of the first embodiment will be denoted by the same reference numerals and will not be described.

Figure 8:
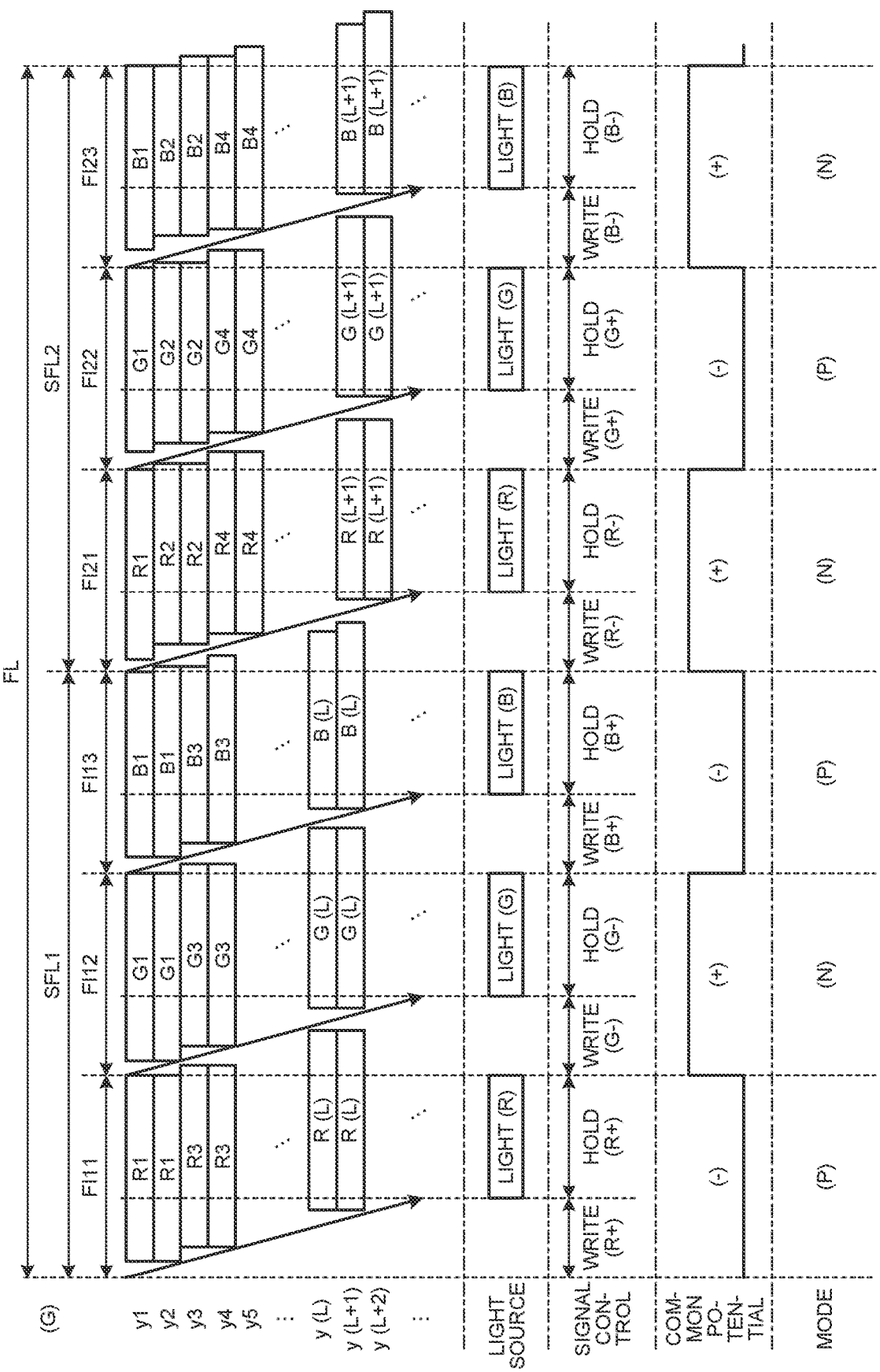
FIG. 8 is a timing diagram illustrating an exemplary flow of the field sequential control according to a second embodiment.

FIG. 8 is a timing diagram illustrating an exemplary flow of the field sequential control according to the second embodiment. In the second embodiment, the polarity of the electric field between the two substrates is inverted at a cycle of the field period. That is, in the second embodiment, the positive (P) mode and the negative (N) mode are switched to each other at the cycle of the field period.

Specifically, as illustrated in FIG. 8, the positive (P) mode is switched to the negative (N) mode between the field period FI11 and the field period FI12; the negative (N) mode is switched to the positive (P) mode between the field period FI12 and the field period FI13; the positive (P) mode is switched to the negative (N) mode between the field period FI13 and the field period FI21 that are continuous with the switching timing from the first sub-frame period SFL1 to the second sub-frame period SFL2 interposed therebetween; the negative (N) mode is switched to the positive (P) mode between the field period FI21 and the field period FI22; and the positive (P) mode is switched to the negative (N) mode between the field period FI22 and the field period FI23. Thereafter, the same mechanism as that of the two field periods (such as the field period FI13 and the field period FI21) continuous with the switching timing from the first sub-frame period SFL1 to the second sub-frame period SFL2 interposed therebetween, applies to two field periods continuous with the switching timing from one of two continuous frame periods FL to the other interposed therebetween.

In the example illustrated in FIG. 8, the first field period in the frame period FL begins with the positive (P) mode but may begin with the other mode. That is, the first field period in the frame period FL may begin with the negative (N) mode.

FIG. 9 is a table diagram illustrating a relation between the luminance index and the light quantity of the light source 11 in each mode in the second embodiment. As illustrated in FIG. 9, in the second embodiment, the relation of the mode with the luminance index and the light quantity of the light source is defined for each field period instead of for each sub-frame period. Specifically, in the second embodiment, for example, the field period FI11, the field period FI13, and the field period FI22 are in the positive (P) mode; and the field period FI12, the field period FI21, and the field period FI23 are in the negative (N) mode. The relation of the mode with the luminance index and the light quantity of the light source in the second embodiment is the same as that in the first embodiment except for differences in the periods in the positive (P) mode and in the periods in the negative (N) mode.

As described above, the second embodiment is the same as the first embodiment except in the respects otherwise explained. According to the second embodiment, the polarity of the electric field between the two substrates (such as the first substrate 30 and the second substrate 20) is inverted at the cycle of the field period. This operation can reduce the deterioration of the liquid crystal 3. In addition, the luminance index can be easily made more uniform even when the luminance index is changed depending on the different modes.

The light quantity of the light source 11 differs between before and after the inversion of the polarity. For example, if the degree of scattering of light in one of the two continuous field periods (for example, the period in the positive (P) mode) is higher than that in the other of the two continuous field periods, the light quantity of the light source 11 in the one of the two continuous field periods is set to be lower than that in the other of the two continuous field periods. As a result, the luminance of the viewed image can be made more uniform even when the luminance index is changed depending on the different modes.

Third Embodiment

The following describes the display device according to a third embodiment. With regard to the description of the third embodiment, the same components as those of the second embodiment will be denoted by the same reference numerals and will not be described.

Figure 10:
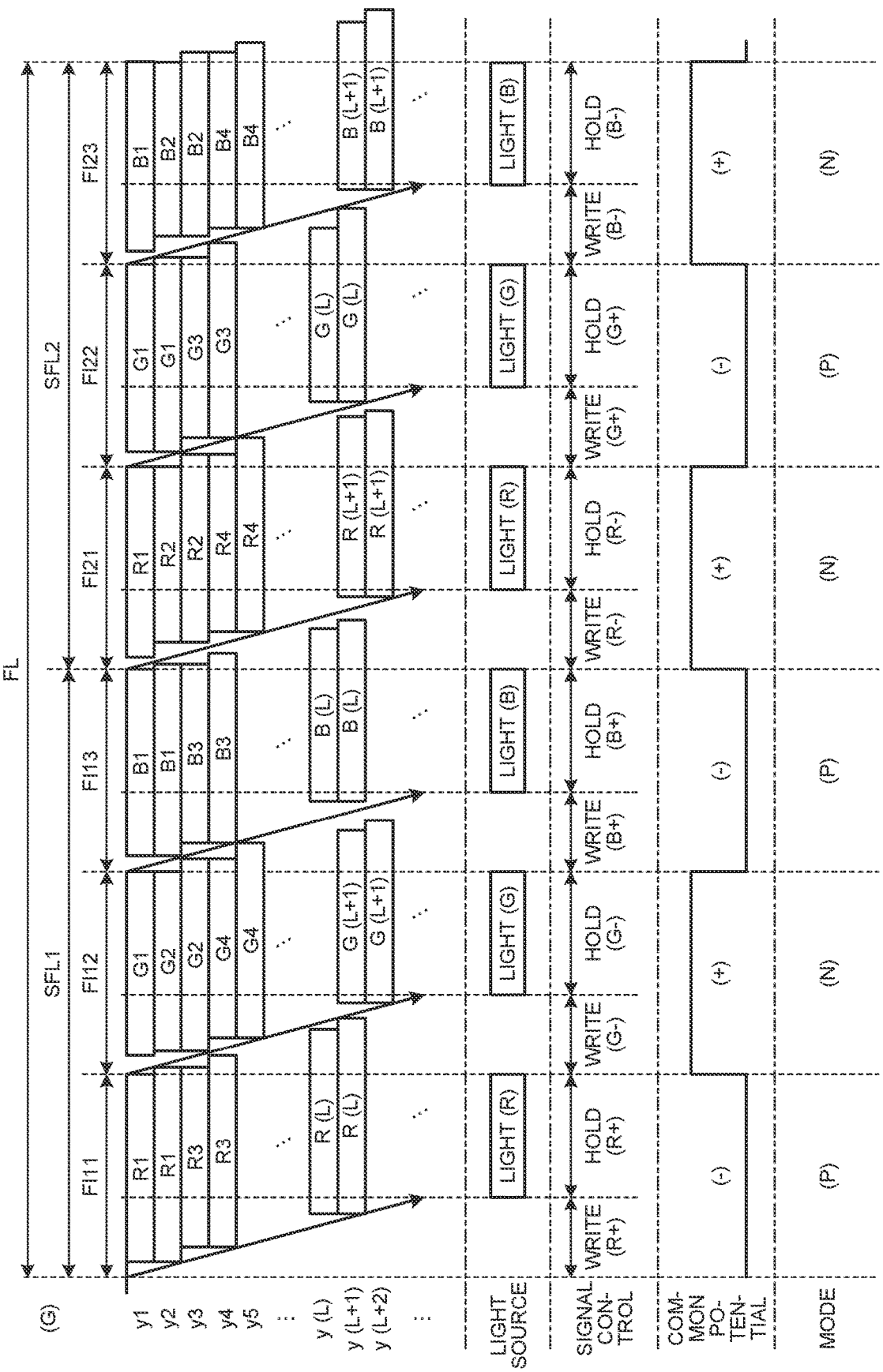
FIG. 10 is a timing diagram illustrating an exemplary flow of the field sequential control according to a third embodiment.

FIG. 10 is a timing diagram illustrating an exemplary flow of the field sequential control according to the third embodiment. In the third embodiment, in two continuous field periods, when a line image to be written in the writing period in the preceding field period differs from a line image to be written in the writing period in the subsequent field period, the start position of the writing period in the preceding field period and the start position of the writing period in the subsequent field period are shifted by one line from each other. That is, the start positions of writing of the line images based on the pixel signals different between the writing periods in the two continuous field periods are shifted by one line from each other.

Specifically, as illustrated in FIG. 10, in the writing period in the field period FI11, line images reflecting "R1" corresponding to the gradation value of red (R) of a line image of the first row among the line images included in the frame image are written to the pixel rows of "y1" and "y2", and line images reflecting "R3" corresponding to the gradation value of red (R) of a line image of the third row are written to the pixel rows of "y3" and "y4". Thereafter, based on the same mechanism, line images reflecting "R(L)" corresponding to the gradation value of red (R) of a line image of the (L)-th row are written to the pixel rows of "y(L)" and "y(L+1)". In this manner, the third embodiment is the same as the first and the second embodiments regarding the field period FI11.

However, in the third embodiment, unlike in the first and the second embodiments, in the writing period in the field period FI12, a line image reflecting "G1" corresponding to the gradation value of green (G) of a line image of the first row among the line images included in the frame image is written to "y1"; line images reflecting "G2" corresponding to the gradation value of green (G) of a line image of the second row among the line images included in the frame image are written to the pixel rows of "y2" and "y3"; and line images reflecting "G4" corresponding to the gradation value of green (G) of a line image of the fourth row are written to the pixel rows of "y4" and "y5". Thereafter, based on the same mechanism, line images reflecting "G(L+1)" corresponding to the gradation value of green (G) of a line image of the (L+1)-th row are written to the pixel rows of "y(L+1)" and "y(L+2)". In this manner, in the third embodiment, the start positions of writing of the line images based on the pixel signals different between the writing periods in the two continuous field periods (such as the field period FI11 and the field period FI12) are shifted by one line from each other.

In the third embodiment, in the same manner as in the first and the second embodiments, in the writing period in the field period FI13, line images reflecting "B1" corresponding to the gradation value of blue (B) of a line image of the first row among the line images included in the frame image are written to the pixel rows of "y1" and "y2", and line images reflecting "B3" corresponding to the gradation value of blue (B) of a line image of the third row are written to the pixel rows of "y3" and "y4". Thereafter, based on the same mechanism, line images reflecting "B(L)" corresponding to the gradation value of blue (B) of a line image of the (L)-th row are written to the pixel rows of "y(L)" and "y(L+1)". In this manner, regarding the field period FI13, the third embodiment turns out to be the same as the first and the second embodiments. However, the start positions of writing of the line images based on the pixel signals different between the writing periods in the two continuous field periods (such as the field period FI12 and the field period FI13) are shifted by one line from each other.

In the third embodiment, in the same manner as in the first and the second embodiments, in the writing period in the field period FI21, a line image reflecting "R1" corresponding to the gradation value of red (R) of a line image of the first row among the line images included in the frame image is written to "y1"; line images reflecting "R2" corresponding to the gradation value of red (R) of a line image of the second row among the line images included in the frame image are written to the pixel rows of "y2" and "y3"; and line images reflecting "R4" corresponding to the gradation value of red (R) of a line image of the fourth row are written to the pixel rows of "y4" and "y5". Thereafter, based on the same mechanism, line images reflecting "R(L+1)" corresponding to the gradation value of red (R) of a line image in the (L+1)-th row are written to the pixel rows of "y(L+1)" and "y(L+2)". In this manner, regarding the field period FI21, the third embodiment turns out to be the same as the first and the second embodiments. However, the start positions of writing of the line images based on the pixel signals different between the writing periods in the two field periods (such as the field period FI13 and the field period FI21) that are continuous with the switching timing from one of two continuous sub-frame periods to the other interposed therebetween, are shifted by one line from each other.

In the third embodiment, unlike in the first and the second embodiments, in the writing period in the field period FI22, line images reflecting "G1" corresponding to the gradation value of green (G) of a line image of the first row among the line images included in the frame image are written to the pixel rows of "y1" and "y2", and line images reflecting "G3" corresponding to the gradation value of green (G) of a line image of the third row are written to the pixel rows of "y3" and "y4". Thereafter, based on the same mechanism, line images reflecting "G(L)" corresponding to the gradation value of green (G) of a line image of the (L)-th row are written to the pixel rows of "y(L)" and "y(L+1)". In this manner, in the third embodiment, the start positions of writing of the line images based on the pixel signals different between the writing periods in the two continuous field periods (such as the field period FI21 and the field period FI22) are shifted by one line from each other.

In the third embodiment, in the same manner as in the first and the second embodiments, in the writing period in the field period FI23, a line image reflecting "B1" corresponding to the gradation value of blue (B) of a line image of the first row among the line images included in the frame image is written to "y1"; line images reflecting "B2" corresponding to the gradation value of blue (B) of a line image of the second row among the line images included in the frame image are written to the pixel rows of "y2" and "y3"; and line images reflecting "B4" corresponding to the gradation value of blue (B) of a line image of the fourth row are written to the pixel rows of "y4" and "y5". Thereafter, based on the same mechanism, line images reflecting "B(L+1)" corresponding to the gradation value of blue (B) of a line image of the (L+1)-th row are written to the pixel rows of "y(L+1)" and "y(L+2)". In this manner, regarding the field period FI23, the third embodiment turns out to be the same as the first and the second embodiments. However, the start positions of writing of the line images based on the pixel signals different between the writing periods in the two continuous field periods (such as the field period FI22 and the field period FI23) are shifted by one line from each other.

As described above, the third embodiment is the same as the second embodiment except in the respects otherwise explained. As described above, according to the third embodiment, in the two continuous field periods, when the line image to be written during the writing period in the preceding field period differs from the line image to be written during the writing period in the subsequent field period, the start position of the writing period in the preceding field period and the start position of the writing period in the subsequent field period are shifted by one line from each other. The start positions of writing of the line images based on the pixel signals different between the writing periods in the two continuous field periods are shifted by one line from each other, and the polarity of the electric field between the two substrates (such as the first substrate 30 and the second substrate 20) is inverted at the cycle of the field period. As a result, line images located in odd-numbered positions and line images located in even-numbered positions in the scan direction in the input signal I can be dispersed among a plurality of sub-frame periods. Thus, even if what is called a stripe pattern having a great luminance difference between the odd-numbered line images and the even-numbered line images is received, the luminance difference between the line images can be restrained from being reflected on a sub-frame period basis.

Fourth Embodiment

The following describes the display device according to a fourth embodiment. With regard to the description of the fourth embodiment, the same components as those of the third embodiment will be denoted by the same reference numerals and will not be described.

Figure 11:
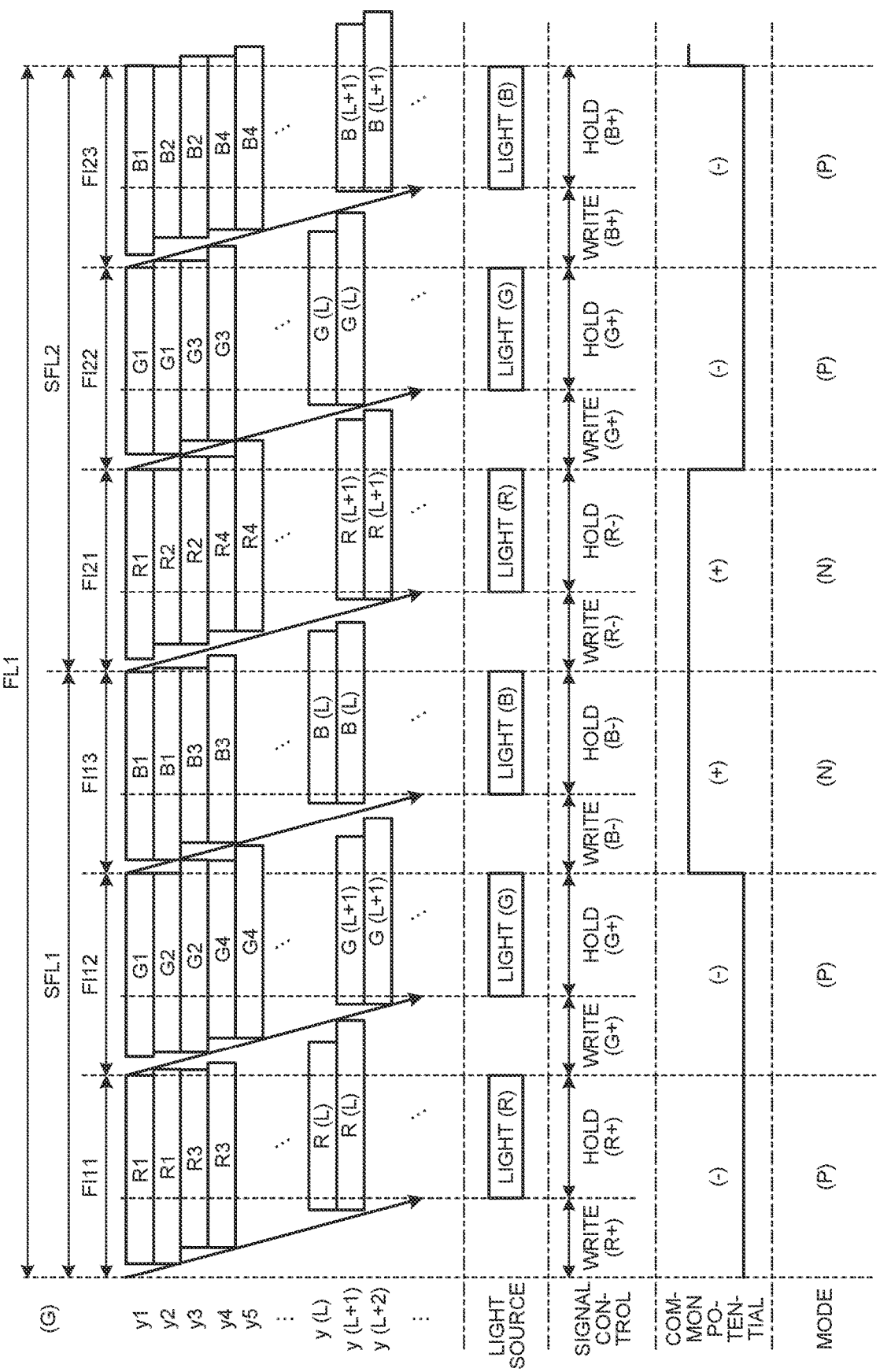
FIG. 11 is a timing diagram illustrating an exemplary flow of the field sequential control according to a fourth embodiment.
Figure 12:
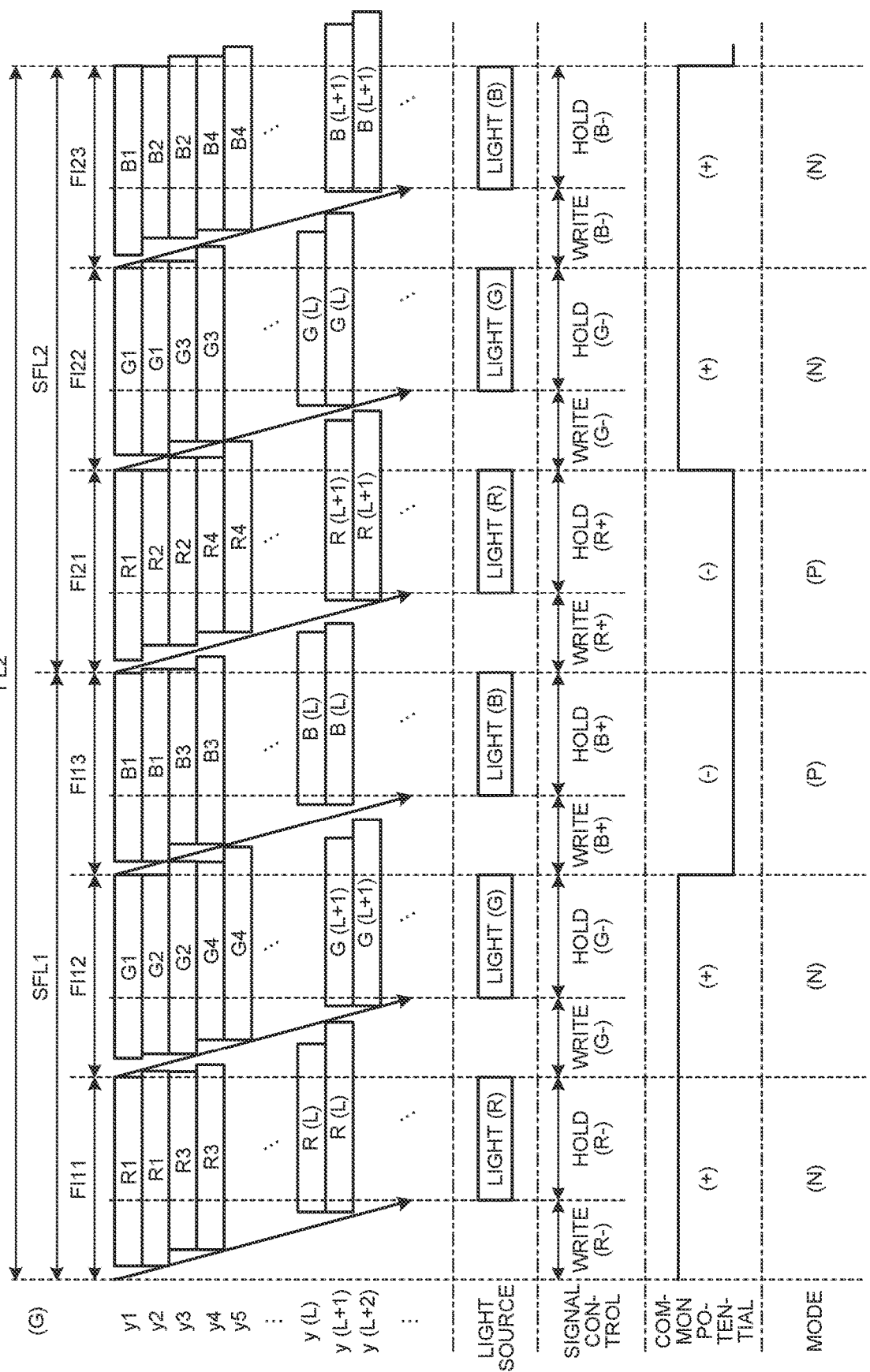
FIG. 12 is another timing diagram illustrating the exemplary flow of the field sequential control according to the fourth embodiment.

FIGS. 11 and 12 are timing diagrams illustrating an exemplary flow of the field sequential control according to the fourth embodiment. FIGS. 11 and 12 illustrate the two periodically continuous frame periods FL in the fourth embodiment. FIG. 11 illustrates a first frame period FL1 that is a preceding one of the two continuous frame periods FL. FIG. 12 illustrates a second frame period FL2 that is a subsequent one of the two continuous frame periods FL. The first frame period FL1 continues again further after the second frame period FL2. In the fourth embodiment, the polarity of the electric field between the two substrates is inverted at a cycle of two field periods. That is, in the fourth embodiment, the positive (P) mode and the negative (N) mode are switched to each other at the cycle of two field periods.

Specifically, as illustrated in FIG. 11, the positive (P) mode continues during the field period FI11 and the field period FI12 of the first frame period FL1 that is the preceding one of the two continuous frame periods FL, and the positive (P) mode is switched to the negative (N) mode between the field period FI12 and the field period FI13; the negative (N) mode continues during two field periods (such as the field period FI13 and the field period FI21) that are continuous with the switching timing from the first sub-frame period SFL1 to the second sub-frame period SFL2 of the first frame period FL1 interposed therebetween; the negative (N) mode is switched to the positive (P) mode between the field period FI21 and the field period FI22; and the positive (P) mode continues during the field period FI22 and the field period FI23 of the first frame period FL1.

As illustrated in FIGS. 11 and 12, the positive (P) mode is switched to the negative (N) mode between the field period FI23 and the field period FI11 that are continuous with the switching timing from one of the two continuous frame periods FL (such as the first frame period FL1 and the second frame period FL2) to the other interposed therebetween. As illustrated in FIG. 12, the negative (N) mode continues during the field period FI11 and the field period FI12 of the second frame period FL2, and the negative (N) mode is switched to the positive (P) mode between the field period FI12 and the field period FI13; the positive (P) mode continues during two field periods (such as the field period FI13 and the field period FI21) that are continuous with the switching timing from the first sub-frame period SFL1 to the second sub-frame period SFL2 of the second frame period FL2 interposed therebetween, and the positive (P) mode is switched to the negative (N) mode between the field period FI21 and the field period FI22; and the negative (N) mode continues during the field period FI22 and the field period FI23 of the first frame period FL1. Then, the negative (N) mode is switched to the positive (P) mode between the field period FI23 and the field period FI11 that are continuous with the switching timing from one of the two continuous frame periods FL (such as the second frame period FL2 and the first frame period FL1) to the other interposed therebetween.

FIGS. 13 and 14 are table diagrams illustrating a relation between the luminance index and the light quantity of the light source 11 in each of the modes in the fourth embodiment. As illustrated in FIGS. 13 and 14, in the fourth embodiment, the relation of the mode with the luminance index and the light quantity of the light source is defined in units of two field periods. Specifically, in the fourth embodiment, for example, the field period FI11, the field period FI12, the field period FI22, and the field period FI23 of the first frame period FL1, and in the field period FI13 and the field period FI21 of the second frame period FL2 are in the positive (P) mode. In addition, the field period FI13 and the field period FI21 of the first frame period FL1, and in the field period FI11, the field period FI12, the field period FI22, and the field period FI23 of the second frame period FL2 are in the negative (N) mode. The relation of the mode with the luminance index and the light quantity of the light source in the fourth embodiment is the same as that in the first embodiment except for differences in the periods in the positive (P) mode and the periods in the negative (N) mode.

As described above, the fourth embodiment is the same as the third embodiment except in the respects otherwise explained. As described above, according to the fourth embodiment, The start positions of writing of the line images based on the pixel signals different between the writing periods in the two continuous field periods are shifted by one line from each other, and the polarity of the electric field between the two substrates (such as the first substrate 30 and the second substrate 20) is inverted at the cycle of two field periods. As a result, line images located in odd-numbered positions and line images located in even-numbered positions in the scan direction in the input signal I can be dispersed among a plurality of sub-frame periods. Thus, even if what is called a stripe pattern having a significant luminance difference between the odd-numbered line images and the even-numbered line images is received, the luminance difference between the line images can be restrained from being reflected on a sub-frame period basis.

The case where the one frame period FL includes the two sub-frame periods has been described above with reference to FIGS. 3 to 14. However, the number of the sub-frame periods is not limited to two and may be three or larger.

FIG. 15 is a timing diagram illustrating an exemplary flow of the field sequential control including three sub-frame periods. In the timing diagram of FIG. 15, the line images are not distinguished in color and are each represented by a combination of "D" and one of the "numbers (1, 2, 3, 4, 5, ..., (L), (L+1), (L+2), ...)" in a rectangle. When the number of colors of the light source 11 is two or larger, that is, when the line images in a plurality of colors are written, the line images are updated for each field period in each sub-field period in the same manner as in the case described with reference to FIG. 3 and other figures. For example, in the case of three colors of RGB, the writing is performed in units of three lines of RGB during each sub-frame period.

In the example illustrated in FIG. 15, line images are written in units of three lines during the writing period. Specifically, during the first sub-frame period SFL1, line images given to pixel rows arranged at a cycle of three rows with two intermediate rows skipped, such as the first row, the fourth row, ..., the (L)-th row, ..., among the line images included in the input signal I are written in units of three lines. During the second sub-frame period SFL2, line images given to pixel rows arranged at a cycle of three rows with two intermediate rows skipped, such as the second row, the fifth row, ..., the (L+1)-th row, ..., among the line images included in the input signal I are written in units of three lines. During a third sub-frame period SFL3, line images given to pixel rows arranged at a cycle of three rows with two intermediate rows skipped, such as the third row, the sixth row, ..., the (L+2)-th row, ..., among the line images included in the input signal I are written in units of three lines. In this manner, the start positions of writing of the line images based on the pixel signals different among the writing periods in each of the three sub-frame periods are shifted by one line from one another between a preceding one and a subsequent one of the continuous sub-frame periods.

Line images that do not correspond to the "line images based on the different pixel signals" are written to the same position even in different sub-frame periods. Specifically, even in the writing periods in the second sub-frame period SFL2 and the third sub-frame period SFL3, the line image reflecting "D1" of the first row is the same data as that in the first sub-frame period SFL1. Also, even in the writing period in the third sub-frame period SFL3, the line image reflecting "D2" of the second row is the same data as that in the second sub-frame period SFL2.

When the number of colors of the light source 11 is one, the writing of "D1" of the first row in the writing periods in the second sub-frame period SFL2 and the third sub-frame period SFL3 and the writing of "D2" of the first row in the writing period in the second sub-frame period SFL2 can be omitted. This is because, when the number of colors of the light source 11 is one, the number of field periods included in one sub-frame period is also one, and therefore, the line image need not be updated in response to the switching of colors within the sub-frame period, and the gradation signal need not be updated in the pixel row in which the line image does not change between continuous sub-frame periods.

The description has been made above, with reference to FIG. 15, regarding the example of updating the line images when the number of sub-frame periods is three. Writing of three line images on a field period basis can be performed in the same manner. In that case, the first sub-frame period SFL1, the second sub-frame period SFL2, and the third sub-frame period SFL3 of FIG. 15 are replaced with a field period FI1, a field period FI2, and a field period FI3. Writing of three line images in units of a plurality of field periods such as in units of two field periods can be performed in the same manner. The writing of the line images described with reference to FIG. 15, the update control of the mode (the positive (P) mode or the negative (N) mode) described in the first to the fourth embodiments, and the control of the light quantity of the light source 11 in accordance with the luminance index may be combined together.

The description has been made above, with reference to FIG. 15, regarding the writing in units of three line images. However, when the number of the sub-frame periods is n, the line images are written in units of n lines, where n is a natural number equal to or larger than two. Even in that case, the start positions of writing of the line images are shifted by one line from each other between a preceding one and a subsequent one of the two writing periods that occur with the continuous sub-frame periods or field periods interposed therebetween.

The combination of the light sources of a plurality of colors included in the light source 11 is not limited to the combination of those of red (R), green (G), and blue (B). For example, the light source 11 may include light sources corresponding to three colors obtained by combining cyan, magenta, and yellow.

The light source device L only needs to be capable of irradiating the liquid crystal display panel P, and the specific arrangement thereof can be changed as appropriate. The light source device L may be, for example, a front light. The liquid crystal display panel P is not limited to a liquid crystal display panel using a polymer-dispersed liquid crystal, and may be a display panel having another configuration such as a transmissive, transflective, or reflective display panel to which the FSC system can be applied. In the case of a transmissive display panel, the light source device L is provided on the back surface side of the display surface.

Other operational advantages accruing from the aspects described in the embodiments disclosed herein that are obvious from the description herein or that are appropriately conceivable by those skilled in the art will naturally be understood as accruing from the present disclosure.

What is claimed is:
1. A display device comprising:
a display panel that comprises a liquid crystal filled between two substrates facing each other and is configured to display a frame image by arranging a plurality of line images in a scan direction; and
a light source that is configured to emit light to the display panel,
wherein
one frame period allocated to the frame image comprises a predetermined number of sub-frame periods, the predetermined number being a natural number equal to or larger than two,
each of the sub-frame periods comprises a writing period of the line images and a display period in which the light is emitted from the light source,
the line images are written in units of a predetermined number of lines during the writing period,
the line images that are written at a time in units of the predetermined number of lines are a same line image,
in two of the sub-frame periods that are continuous in the one frame period, when a line image to be written during the writing period in a preceding sub-frame period of the two sub-frame periods differs from a line image to be written during the writing period in a subsequent sub-frame period of the two sub-frame periods, a start position of the writing period in the preceding sub-frame period and a start position of the writing period in the subsequent sub-frame period are shifted by one line from each other, the light source comprises a plurality of light sources of a plurality of colors, lighting periods of which are individually controllable, each of the sub-frame periods comprises a plurality of field periods each provided for a corresponding color of the colors, each of the field periods comprises the writing period and the display period, a polarity of an electric field between the two substrates is inverted at a cycle of the plurality of field periods, a light quantity of the light source is set to be different between before and after the inversion of the polarity, and when a degree of scattering of light by the liquid crystal in one of two continuous field periods is higher than that in the other of the two continuous field periods, the light quantity of the light source in the one of the two continuous field periods is configured to be set to be lower than that in the other of the two continuous field periods.

2. A display device comprising:

a display panel that comprises a liquid crystal filled between two substrates facing each other and is configured to display a frame image by arranging a plurality of line images in a scan direction; and a light source that is configured to emit light to the display panel, wherein one frame period allocated to the frame image comprises a predetermined number of sub-frame periods, the predetermined number being a natural number equal to or larger than two, each of the sub-frame periods comprises a writing period of the line images and a display period in which the light is emitted from the light source, the line images are written in units of a predetermined number of lines during the writing period, the line images that are written at a time in units of the predetermined number of lines are a same line image, in two of the sub-frame periods that are continuous in the one frame period, when a line image to be written during the writing period in a preceding sub-frame period of the two sub-frame periods differs from a line image to be written during the writing period in a subsequent sub-frame period of the two sub-frame periods, a start position of the writing period in the preceding sub-frame period and a start position of the writing period in the subsequent sub-frame period are shifted by one line from each other, the line images are written in units of two lines during the writing period, the line images that are written at a time in units of two lines are a same line image, a line image includes: a preceding line image to be written during the writing period in the preceding sub-frame period of the two of the sub-frame periods, and a subsequent line image to be written during the writing period in the subsequent sub-frame period of the two of the sub-frame periods, and in the two of the sub-frame periods that are continuous in the one frame period, when the preceding line image is different from the subsequent line image, a component of a line image output to be displayed is an average of a component of the preceding line image and a component of the subsequent line image.

3. The display device according to claim 2, wherein a line image that is written in the subsequent sub-frame period of the two continuous sub-frame periods in the one frame period and is located on an upper stream side in the scan direction of the start position, is same as a line image that is written the preceding sub-frame period of the two continuous sub-frame periods.

4. The display device according to claim 2, wherein the light source comprises a plurality of light sources of a plurality of colors, lighting periods of which are individually controllable, each of the sub-frame periods comprises a plurality of field periods each provided for a corresponding color of the colors, and each of the field periods comprises the writing period and the display period.

5. The display device according to claim 4, wherein a polarity of an electric field between the two substrates is inverted at a cycle of the plurality of field periods.

6. The display device according to claim 5, wherein a light quantity of the light source is set to be different between before and after the inversion of the polarity.

7. The display device according to claim 2, wherein a polarity of an electric field between the two substrates is inverted at a cycle of a predetermined period.

8. The display device according to claim 7, wherein the predetermined period is the sub-frame period.

9. A display device comprising:

a display panel that comprises a liquid crystal filled between two substrates facing each other and is configured to display a frame image by arranging a plurality of line images in a scan direction; and a light source that is configured to emit light to the display panel, wherein one frame period allocated to the frame image comprises a predetermined number of sub-frame periods, the predetermined number being a natural number equal to or larger than two, the light source comprises a plurality of light sources of a plurality of colors, lighting periods of which are individually controllable, each of the sub-frame periods comprises a plurality of field periods each provided for a corresponding color of the colors, each of the field periods comprises a writing period of the line images and a display period in which the light is emitted from the light source, the line images are written in units of a predetermined number of lines during the writing period, the line images that are written at a time in units of the predetermined number of lines are a same line image, in continuous two of the field periods, when a line image to be written during the writing period in a preceding field period of the two field periods differs from a line image to be written during the writing period in a subsequent field period of the two field periods, a start position of the writing period in the preceding field period and a start position of the writing period in the subsequent field period are shifted by one line from each other, a polarity of an electric field between the two substrates is inverted at a cycle of the plurality of field periods, the line images are written in units of two lines during the writing period, the line images that are written at a time in units of two lines are a same line image, a line image includes: a preceding line image to be written during the writing period in a preceding sub-frame period of two of the sub-frame periods, and a subsequent line image to be written during the writing period in a subsequent sub-frame period of the two of the sub-frame periods, and in two of the sub-frame periods that are continuous in the one frame period, when a preceding line image is different from a subsequent line image, a component of a line image output to be displayed is an average of a component of the preceding line image and a component of the subsequent line image.

10. A display device comprising:

a display panel that comprises a liquid crystal filled between two substrates facing each other and is configured to display a frame image by arranging a plurality of line images in a scan direction; and a light source that is configured to emit light to the display panel, wherein one frame period allocated to the frame image comprises a predetermined number of sub-frame periods, the predetermined number being a natural number equal to or larger than two, the light source comprises a plurality of light sources of a plurality of colors, lighting periods of which are individually controllable, each of the sub-frame periods comprises a plurality of field periods each provided for a corresponding color of the colors, each of the field periods comprises a writing period of the line images and a display period in which the light is emitted from the light source, the line images are written in units of a predetermined number of lines during the writing period, the line images that are written at a time in units of the predetermined number of lines are a same line image, in continuous two of the field periods, when a line image to be written during the writing period in a preceding field period of the two field periods differs from a line image to be written during the writing period in a subsequent field period of the two field periods, a start position of the writing period in the preceding field period and a start position of the writing period in the subsequent field period are shifted by one line from each other, a polarity of an electric field between the two substrates is inverted at a cycle of two field periods, the line images are written in units of two lines during the writing period, the line images that are written at a time in units of two lines are a same line image, a line image includes: a preceding line image to be written during the writing period in a preceding sub-frame period of two of the sub-frame periods, and a subsequent line image to be written during the writing period in a subsequent sub-frame period of the two of the sub-frame periods, and in two of the sub-frame periods that are continuous in the one frame period, when a preceding line image is different from a subsequent line image, a component of a line image output to be displayed is an average of a component of the preceding line image and a component of the subsequent line image.

* * * * *